(12) United States Patent
Zhang (10) Patent No.: US 7,840,683 B2
(45) Date of Patent: Nov. 23, 2010

(54) SYSTEMS AND METHODS OF MIGRATING SESSIONS BETWEEN COMPUTER SYSTEMS

(75) Inventor: Yi Zhang, Newtownabbey (GB)

(73) Assignee: SAP AG, Walldorf (DE)

( * ) Notice: Subject to any disclaimer, the term of this patent is extended or adjusted under 35 U.S.C. 154(b) by 750 days.

(21) Appl. No.: 11/514,543

(22) Filed: Aug. 31, 2006

(65) Prior Publication Data

US 2008/0059639 A1    Mar. 6, 2008

(51) Int. Cl.
G06F 15/16 (2006.01)
(52) U.S. Cl. ............... 709/227; 709/203; 709/217; 709/223
(58) Field of Classification Search ......... 709/227–229, 709/203; 370/431–463
See application file for complete search history.

(56) References Cited

U.S. PATENT DOCUMENTS

| | | | |
|---|---|---|---|
| 5,951,694 | A | 9/1999 | Choquier et al. |
| 6,324,582 | B1 | 11/2001 | Sridhar et al. |
| 6,601,101 | B1 * | 7/2003 | Lee et al. ............... 709/227 |
| 6,754,709 | B1 | 6/2004 | Gbadegesin |
| 6,779,017 | B1 | 8/2004 | Lamberton et al. |
| 6,779,035 | B1 | 8/2004 | Gbadegesin |
| 6,813,635 | B1 | 11/2004 | Jorgenson |
| 6,856,991 | B1 | 2/2005 | Srivastava |
| 6,877,111 | B2 * | 4/2005 | Sharma et al. ............ 714/13 |
| 6,880,089 | B1 | 4/2005 | Bommareddy et al. |
| 6,941,341 | B2 | 9/2005 | Logston et al. |
| 6,993,556 | B1 * | 1/2006 | Seliger et al. ............ 709/203 |
| 7,047,315 | B1 | 5/2006 | Srivastava |
| 7,287,090 | B1 * | 10/2007 | Berg ..................... 709/238 |
| 2004/0083292 | A1 * | 4/2004 | Lueckhoff et al. ......... 709/227 |
| 2005/0055435 | A1 * | 3/2005 | Gbadegesin et al. ....... 709/224 |
| 2005/0262411 | A1 | 11/2005 | Vertes et al. |
| 2006/0067342 | A1 | 3/2006 | Dispensa |
| 2006/0143290 | A1 * | 6/2006 | Dostert et al. ............ 709/224 |
| 2006/0187838 | A1 | 8/2006 | Alex et al. |
| 2006/0233376 | A1 * | 10/2006 | Forsberg et al. ........... 380/277 |
| 2006/0291481 | A1 * | 12/2006 | Kumar .................... 370/400 |
| 2007/0226214 | A1 * | 9/2007 | Smits ...................... 707/7 |

(Continued)

OTHER PUBLICATIONS

G. Teodoro et al, "Load Balancing on Stateful Clustered Web Servers", Proceedings. 15th Symposium on Computer Architecture and High Performance Computing, Nov. 10, 2003, p. 207-215.

(Continued)

*Primary Examiner*—Joseph E Avellino
*Assistant Examiner*—Jenee Williams
(74) *Attorney, Agent, or Firm*—Fountainhead Law Group PC (57) ABSTRACT

Embodiments of the present invention include systems and methods of migrating sessions between computer systems. In one embodiment, the present invention includes a session migration method comprising managing, by a session manager, a session between a client and a first server using network address translation, managing, by a first server, a context for the client, wherein the context is related to the session, determining that the session is to be moved from the first server, identifying, by the session manager, a second server other than the first server to manage the context, sending the context from the first server to the second server; managing, by the session manager, the session between the client and the second server using network address translation, and managing, by the second server, the context.

16 Claims, 5 Drawing Sheets

U.S. PATENT DOCUMENTS

2007/0234342 A1* 10/2007 Flynn et al. .................. 717/174
2007/0244937 A1* 10/2007 Flynn et al. .................. 707/204
2007/0294578 A1* 12/2007 Qiao et al. .................... 714/17

OTHER PUBLICATIONS

P. Srisuresh et al, "Local Sharing Using IP Network Address Translation", Internet Engineering Task Force, Aug. 1998, pp. 1-20.

Saitoh et al, "A Transparent Session Migration and Transparent Failover Protocol for PPPoE Server Cluster", 2004 Internat'l Symposium on Applications and the Internet, 2004.

Barak et al, "MOSIX for Organizational Grids", www.MOSIX.org, Aug. 2006.

Zhang et al, "Linux Virtual Server Clusters", Linux Magazine, Nov. 15, 2003.

P. Srisuresh, "Traditional IP Network Address Translator", Jan. 2001, Intel Corporation.

\* cited by examiner

SYSTEMS AND METHODS OF MIGRATING SESSIONS BETWEEN COMPUTER SYSTEMS

CROSS REFERENCE TO RELATED APPLICATIONS

Not applicable.

BACKGROUND

The present invention relates to session migration, and in particular, to migrating sessions in a client-server environment.

In general, a client-server architecture is a type of distributed computer system in which the computers are connected via a network. Client-server systems are widely used in modern enterprise systems. For example, the SAP R/3 system and the JAVA 2 enterprise edition (J2EE) system are based on a client-server architecture. In a client-server system, computers are divided into two types: the clients and the servers. The clients send requests to the servers, and the servers handle the requests from the clients.

In modern client-server systems, more than one server may exist on the server side. Some kind of session management technologies, such as load balancing, may be used to assign client sessions to different servers, for example. In general, session management may be static or dynamic.

In the static case, a client may be assigned to a particular server when the client joins the network. An example of a static session management system is the Linux Virtual Server system, as understood. However, static load balancing systems lack the flexibility to respond to dynamic load changes of the servers. In addition, static load balancing is generally unresponsive to server failures, so for reliability and dependability reasons, many business applications use dynamic techniques.

The MOSIX system, as understood, is an example clustering technology that supports dynamic session management. However, the MOSIX system is generally unsuitable for client-server systems because the MOSIX system as understood migrates processes between servers without consideration of network connections. In client-server systems, for example, clients typically establish connections with a server through a network address and port. The network address is usually associated with a machine instead of a process. When a server process is migrated from one server to another, all clients connected to the process may be required to change the related network and port address information about the process. It is not an easy task to let all clients be involved in the migration process. Thus, the MOSIX system as understood is undesirable in certain environments.

U.S. Patent Application No. 2005/0262411 ("the '411 application"), as understood, describes another system for dynamic session management. The '411 application, as understood, describes migrating clients between servers by migrating processes. The '411 application, as understood, addresses the network connection problem (described above with reference to the MOSIX system) when migrating processes between a primary server and secondary servers. There is a virtual IP address associated with the process on the primary server. After migrating, the secondary server takes over the virtual IP address. All clients then establish connection with a server through a virtual IP address. In this way, the method described in the '411 application addresses the issues involved when migrating processes between servers.

However, it is often desirable to perform dynamic session management in ways other than by migrating processes between servers. In certain situations, it is undesirable to migrate the entire process because of the network overhead involved. In such situations, the '411 application as understood is deficient.

In addition, it is often desirable to perform dynamic load balancing in ways other than migrating an IP address among servers. When migrating an IP address between servers, modifications are required on both data link layer and transport layer. Typically, network equipment have information about each other with MAC (Media Access Control) addresses at the data link layer. Each server has it's own unique MAC addresses. A protocol (e.g., ARP/RARP) is used to map an IP address to an MAC address. If an IP address is migrated from one server to another, the MAC address associated with the IP address has to be changed. To ensure the communication between clients and servers will not be interrupted, all network equipments within the same network segment have to be informed about the change of the MAC address. Furthermore, modifications may also need to be done at the transport layer. The communication at the network (IP) layer is stateless; but the communication at the transport layer includes state information. When migrating an IP address from one server to another to maintain communication between clients and servers, the inner states in the transport layer of the first server may need to be transferred and reinitialized at the second server. Due to the above complexity in the data link layer and the transport layer, migrating IP addresses among servers is not desirable.

Akinori Saitoh and Hideo Masuda in "A Transparent Session Migration and Transparent Fail-over Protocol for PPPoE Server Cluster", as understood, describe a PPPoE client migration scheme (hereafter termed "the PPPoE scheme"). The PPPoE scheme, as understood, works at the network layer and depends upon modification of the network flow of the data link layer (layer 2) to work. However, it is often desirable to work at a layer other than the network layer or to modify the network flow at a level other than the data link layer (layer 2). In addition, the PPPoE scheme as understood works at the client end of communication. However, it is often desirable to perform session management by network components other than the clients. Additionally, the PPPoE scheme as understood requires that all clients be located in a Layer 2 switch network. However, it is often desirable to include clients in other than a Layer 2 switch network. Furthermore, the PPPoE scheme as understood assigns a unique MAC address to each client and migrates the MAC address of the client from one server to another when it migrates a session. However, it is often desirable to not assign MAC addresses to clients or to migrate address information of clients between servers. Finally, the PPPoE scheme as understood requires server components to broadcast its session information every second. However, it is often desirable not to broadcast session information. Accordingly, the PPPoE scheme as understood has many potential disadvantages.

There is a desire to perform session management, such as load balancing, in a manner that is transparent to the clients. In addition, there is a desire to perform session management with reduced network overhead. Moreover, there is a desire to perform session management without migrating a virtual IP address among servers.

Thus, there is a need for improved session management. The present invention solves these and other problems by providing systems and methods of migrating sessions between computer systems.

SUMMARY

Embodiments of the present invention improve upon existing session management approaches. In one embodiment, the present invention includes a session migration method comprising managing, by a session manager, a session between a client and a first server using network address translation, managing, by a first server, a context for the client, wherein the context is related to the session, determining that the session is to be moved from the first server, identifying, by the session manager, a second server other than the first server to manage the context, sending the context from the first server to the second server; managing, by the session manager, the session between the client and the second server using network address translation, and managing, by the second server, the context.

In one embodiment, the present invention further comprises notifying, by the first server to the session manager, that the context is ready for transfer from the first server, after the step of identifying.

In one embodiment, the present invention further comprises defining, by the first server prior to the step of notifying, a checkpoint for holding the context in a current state, wherein the step of notifying is performed after the checkpoint has been reached.

In one embodiment, the present invention further comprises sending, from the first server to the second server, a pending request from the client, after the step of notifying.

In one embodiment, the present invention further comprises instructing, by the session manager after the step of notifying, the second server to expect the context from the first server.

In one embodiment, the present invention further comprises sending, from the session manager to the first server, address information of the second server, wherein the first server uses the address information when sending the context from the first server to the second server.

In one embodiment, the step of determining is performed by a session manager in the client-server system.

In one embodiment, the step of determining is performed by the first server.

In another embodiment, the present invention includes a session manager for migrating a client session in a client-server network, the session manager comprising a server selection component that selects a first server to use for a session for a client, a network address translation component that performs network address translation between the client and the first server in the client-server system, and a control component that controls a migration process by executing processing that includes identifying, using the server selection component, a second server to use for the session, informing the first server that the second server is to be used, and migrating, using the network address translation component, the session from the first server to the second server.

In one embodiment, the control component identifies the second server after receiving, from the first server, a request to migrate the session from the first server.

In one embodiment, the control component identifies the second server after using the server selection component to determine that a load on the first server is above a defined threshold.

In one embodiment, the session manager further comprises a request queue that queues one or more requests from the client during the migration process, wherein the one or more requests are stored in the queue after the first server has been informed that the second server is to be used, and the one or more requests are sent to the second server after the session has been migrated from the first server.

In one embodiment, the control component migrates the session after receiving an acknowledgement from the first server that a checkpoint has been reached.

In another embodiment, the present invention includes a server for migrating a client session in a client-server network comprising a program logic component that executes one or more algorithms, a program information component that stores program information, a context storage component that stores a context related to a session with a client, wherein the program logic component uses the context when executing algorithms on the program information, and a control component that controls a migration process by executing processing that includes receiving, from a session manager, information of an other server to which the session with the client is to be migrated, sending, to the other server, the context, and acknowledging, to the session manager, that the context has been sent.

In one embodiment, the server further comprises a checkpoint processor component that identifies a checkpoint for holding the context in a current state.

In one embodiment, the context storage component stores any pending requests after the checkpoint has been reached, and wherein the control component sends the any requests to the other server with the context.

In one embodiment, the control component determines that the session should be moved from the server.

In one embodiment, the control component sends to the session manager a request that the session be moved.

The following detailed description and accompanying drawings provide a better understanding of the nature and advantages of the present invention.

DETAILED DESCRIPTION

Described herein are techniques for session management. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

The following description describes various methods and processes. Although the particular method steps are discussed in a particular order, such discussion is mainly for clarity of presentation. It should be recognized that such order may be varied, and some steps may be performed in parallel. One step need only follow another step when the other step must be completed before the one step begins.

The following description describes various computer-implemented method and processes, using terms such as "logic", "computer programs", "software", "function blocks", "components", or other terms. The specific implementation of the computer-implemented processes may vary depending upon the specific computer system hardware and network implementation selected. In general, computer-implemented processes may be implemented wholly or partially in software, hardware, firmware, or as combinations of hardware and software according to other implementations of a specific computer system.

Figure 1:
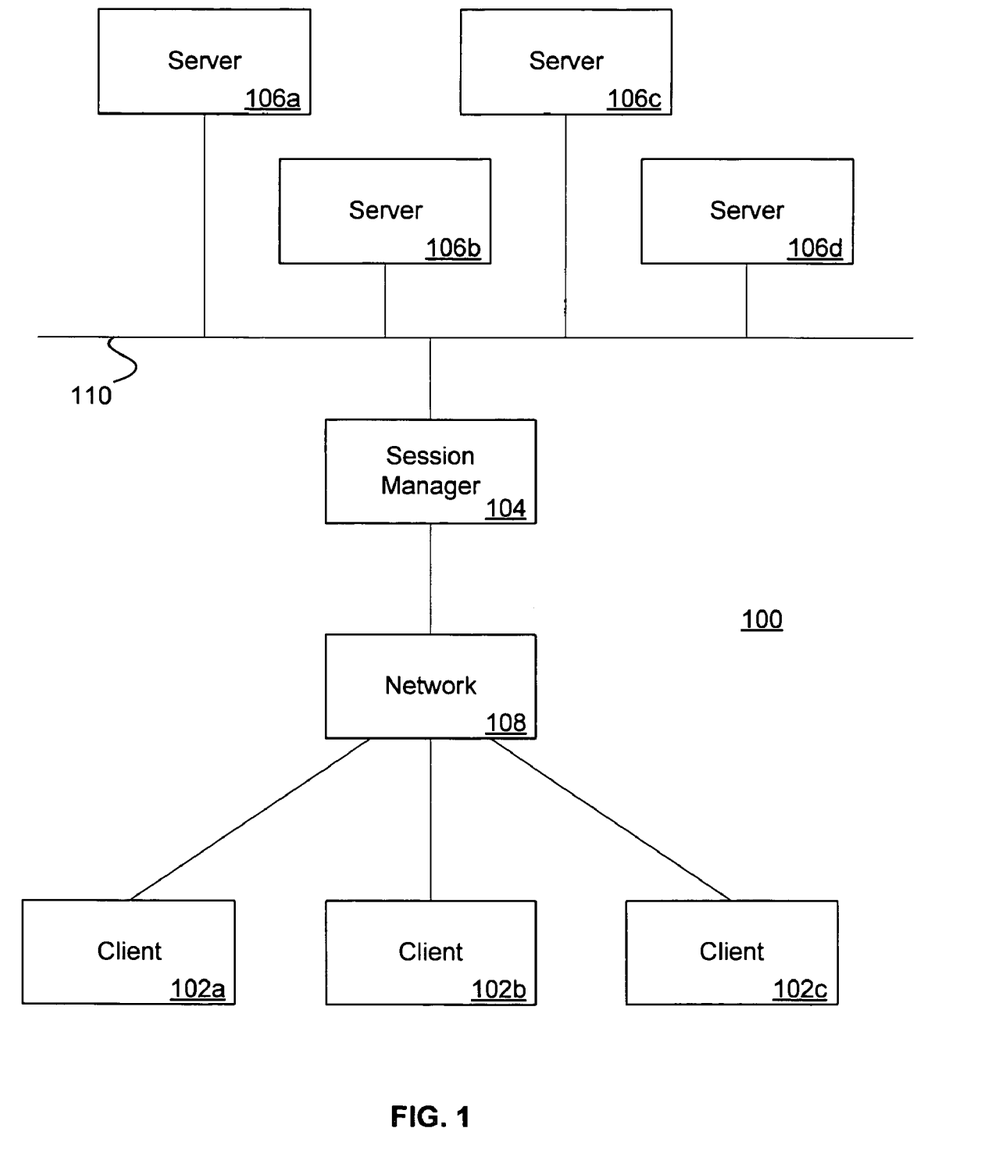
FIG. 1 is a block diagram of a client-server system according to an embodiment of the present invention.

FIG. 1 is a block diagram of a client-server system 100 according to an embodiment of the present invention. The client-server system 100 includes one or more clients 102 (clients 102 collectively, or clients 102a, 102b and 102c individually), a session manager 104, and a number of servers 106 (servers 106 collectively, or servers 106a, 106b, 106c and 106d individually). A network 108 connects the clients 102 and the session manager 104. A link 110 connects the servers 106 and the session manager 104.

The specific implementation of the link 110 may vary depending upon the implementation of the session manager 104 and the servers 106. For example, in one implementation, the session manager 104 and the servers 106 are in close proximity. In another implementation, the session manager 104 and the servers 106 are not in close proximity. In any case, the network 108 and the link 110 are shown as separate elements to illustrate that the clients 102 interact with the servers 106 via the session manager 104. However, in some implementations the network 108 and the link 110 may be connected together or may be parts of the same network, for example, the Internet.

The clients 102 send requests to the servers 106. The clients 102 may implement presentation logic, for example, generating the requests and displaying the results of the requests.

The servers 106 handle the requests from the clients 102. The servers 106 may store the business information and implement the business logic, for example, processing the business information and responding to requests. The servers 106 may also include migration logic for performing migration as further detailed below.

The session manager 104 acts as a network gateway between the clients 102 and the servers 106. The session manager 104 monitors the current workload of the servers 106 and exposes its own internet protocol (IP) address to the clients 102. An example session manager 104 may act as a load balancer, for example. The clients 102 know the IP address of the session manager 104 and may not know the actual addresses of servers 106. For example, in one embodiment all communication between the clients 102 and the servers 106 goes through the session manager 104.

In the enterprise environment of the system 100, the assignment of a particular client 102a to a particular server 106a may be performed by the session manager 104. A client session occurs between the time the client 102a enters the system and the time it leaves. When a client 102b enters the system, the session manager 104 assigns a server 106b to the client 102b. During the session, requests from the client 102b are handled by the assigned server 106b.

However, in some situations, it would be desirable to allow a client session to be moved from one server 106b to another server 106c. For example, one of the servers 106b may be heavily loaded, and the performance of the server 106b may degrade. At the same time, one of the other servers 106c may be idle or under loaded. If some client sessions in the heavily loaded server 106b could be moved to other idle or under loaded servers, the performance of the whole system can be improved. This is an example of load balancing. As another example, consider system maintenance. When a server 106b needs urgent maintenance, on-going client sessions on the server 106b may need an arbitrarily long time to finish. If the client sessions can be moved from that server 106b to other servers 106, the maintenance work for that server 106b can start immediately after the moving.

To migrate a client session from one server 106b to another server 106c, embodiments of the present invention may first move the context of a client session (i.e., "client context") from the original server 106b to the new server 106c. Additionally, communication between the client 102b and the new server 106c should be established. Future requests from the client 102b should be forwarded to the new server 106c.

Client context is information associated with a particular client session running on a server. For example, if a user enters a bank card and pin number, such information may be transferred to a server program at a bank and used in a particular transaction. The information from the bank card and the pin number are used by the server to establish a context for performing transactions for this particular session. Client context may be stored together in memory in a data structure (e.g., an object). Client context may also include state information of the server software. Thus, the credentials and states of a client session on the server may be part of its context. Such context may be established when a client 102b logs on to the system, and may be updated continuously during the session. Such session information and state information may then be transferred from one server to another at any time.

Client context at the server side should be properly maintained and transferred to the new server 106c. For a client session, only one (active) context may be maintained at the server side. The server 106b handles a request from a client 102b based on the context of the client. The return results usually depend on the particular client context. Each client context stays at the server that is serving each client for the whole of each session. To move a client session from one server 106b to another server 106c, the client context should be copied to the new server 106c. To avoid confusion at the client side, the two servers 106b and 106c should not send results to the client 102b at the same time.

Establishing communication between the client 102b and the new server 106c is another challenge in migrating client sessions between servers. The connection between a client 102 and its server 106 is usually a transmission control protocol (TCP) connection. To switch to a new server 106c, the connection between the client 102b and the old server 106b needs be terminated and a new connection between the client 102b and the new server 106c must be established. The data transmission between the client 102b and servers 106b and 106c must be coordinated with the client context transfer. Otherwise, the client 102b could send a request to the new server 106c and the new server 106c does not have the corresponding client context to handle the request.

One problem solved by embodiments of the present invention is migrating client sessions in the client-server system 100 without any actions from the clients 102. Currently, several servers 106 usually exist in a production client-server system to serve requests from the clients 102. In each client session, a client 102a is assigned to one of the servers 106a by the session manager 104. Normally, a client 102a only communicates with its assigned server 106a during its session.

However, it is desirable to migrate a client session from one server 106a to another server 106b.

Embodiments of the present invention provide a system and method to allow a client session to migrate to a new server without the awareness or participation of the client. The scheme is based on network address translation. Network address translation (NAT) is an internet technology that translates IP addresses in IP communication from one group to another group without the knowledge of end users. Embodiments of the present invention use session maintenance technology on the servers 106 and network address translation in the session manager 104 to migrate a client session between two servers in client-server systems without the knowledge and intervention of the clients.

Two features of embodiments of the present invention discussed below include a session manager 104 based on network address translation and a process of extracting and transferring client contexts. The session manager 104 is based on NAT and redirects client requests to the servers 106 by translating IP addresses between servers. The process of extracting and transferring client contexts depends upon the specific implementation of the client/server systems. For example, for J2EE systems, session beans, which represent a client on the server and contain the client context, can be serialized; for SAP R/3 systems, the client contexts are stored in the roll areas in memory, which are memory areas specially allocated for storing user context. Embodiments of the present invention may include server software and session management software (e.g., load balancing) to facilitate migration of client sessions. By integrating the above two parts, embodiments of the present invention migrate client sessions between servers without knowledge and intervention from clients.

Figure 2:
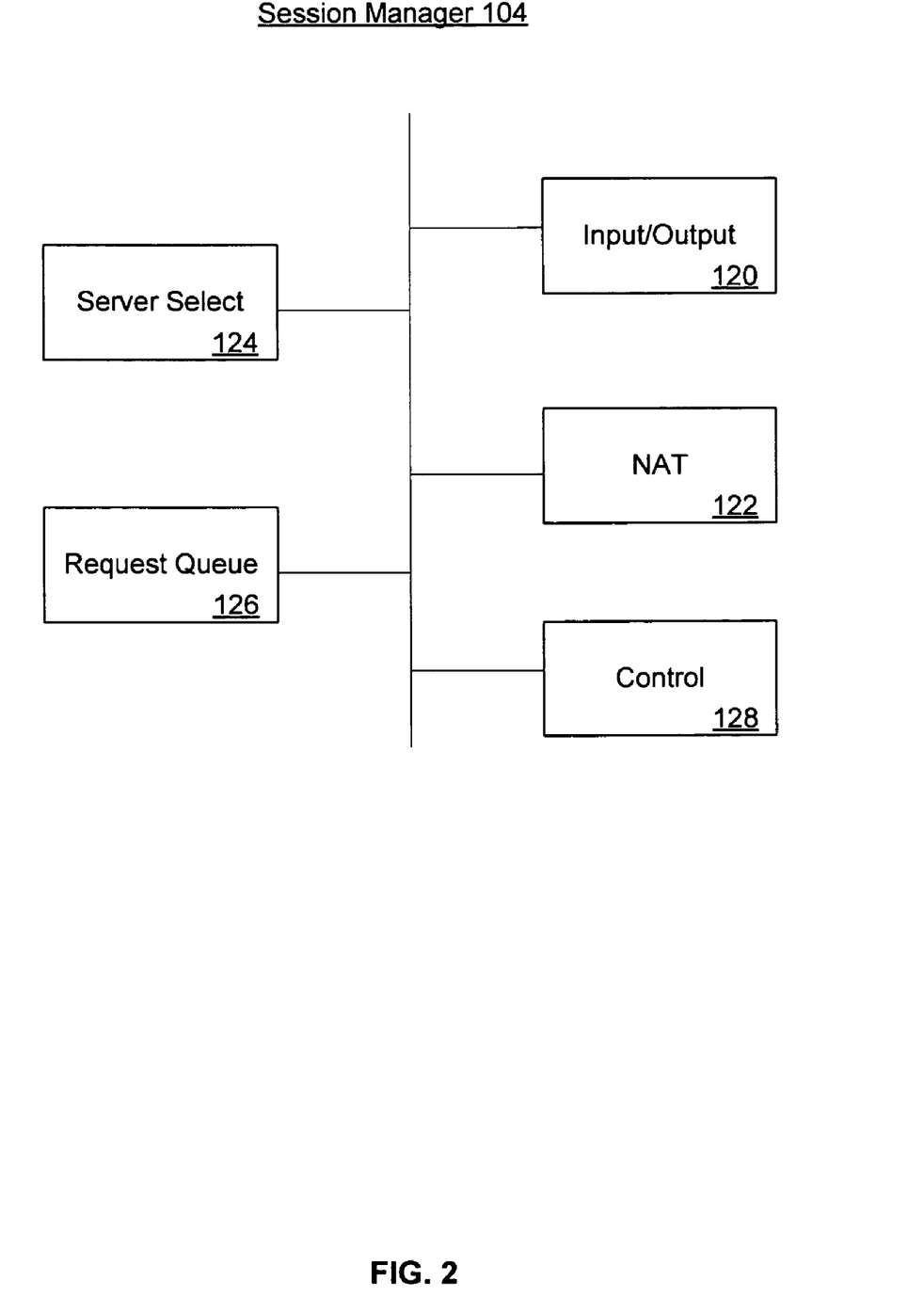
FIG. 2 illustrates a session manager according to an embodiment of the present invention.

FIG. 2 illustrates a session manager according to an embodiment of the present invention. The session manager 104 includes an input/output block 120, a network address translation block 122, a server selection block 124, a request queue 126, and a control block 128. These functional blocks are shown in a functional relationship in FIG. 2. The specific arrangement, features, relationships, interactions, etc. between the functional blocks may vary, depending upon the actual implementation of the hardware and software of the session manager 104.

The input/output block 120 interfaces the session manager 104 to the network 108 and to the link 110. The input/output block 120 receives requests from the clients 102, sends the requests to the servers 106, receives responses to the requests from the servers 106, and sends the responses to the clients 102.

The network address translation ("NAT") block 122 performs network address translation on the network packets from the clients 102 (to be sent to the servers 106) and on the network packets from the servers 106 (to be sent to the clients 102). Further details regarding network address translation are given below with reference to FIG. 4.

The server selection block 124 selects one of the servers 106 to serve the requests of a particular one of the clients 102. The server selection block 124 may facilitate session migration by monitoring the requests that the session manager 104 routes from the clients 102 to the various servers 106. According to one embodiment, when a client starts a new session, the server selection block 124 selects a server to serve the requests for that client. Server selection may be based on different load balancing strategies, for example. Possible load balancing strategies include choosing a server in a round-robin way, choosing a server according to current work load of all servers (e.g., the server with the lowest current load), choosing a server randomly, or choosing a server according to load prediction of all servers.

The request queue 126 stores requests received from the clients. During session migration (discussed more fully below with reference to FIG. 5), requests may be received from a client that should be stored for a time and not immediately forwarded to a server. For example, during session migration, the current server may be trying to finish tasks so that migration can proceed. Similarly, during session migration, the next server may not yet be ready to receive requests from the new client. In such cases, the request queue 126 stores the requests until the new server is ready.

The control block 128 performs overall control and coordination of the functional blocks of the session manager 104. Control block 128 may maintain a table with information about all current connections between clients and servers. It may coordinate the activities of session migration by instructing the NAT block 122 on when to change the NAT table and instruct the request queue block 126 to withhold requests from certain clients during session migration. Control block 128 may also monitor the load on all servers from time to time. Control block 128 may also determine when to start the session migration process for some clients when some criteria are met (e.g., if the load of a server exceeds some limits).

Figure 3:
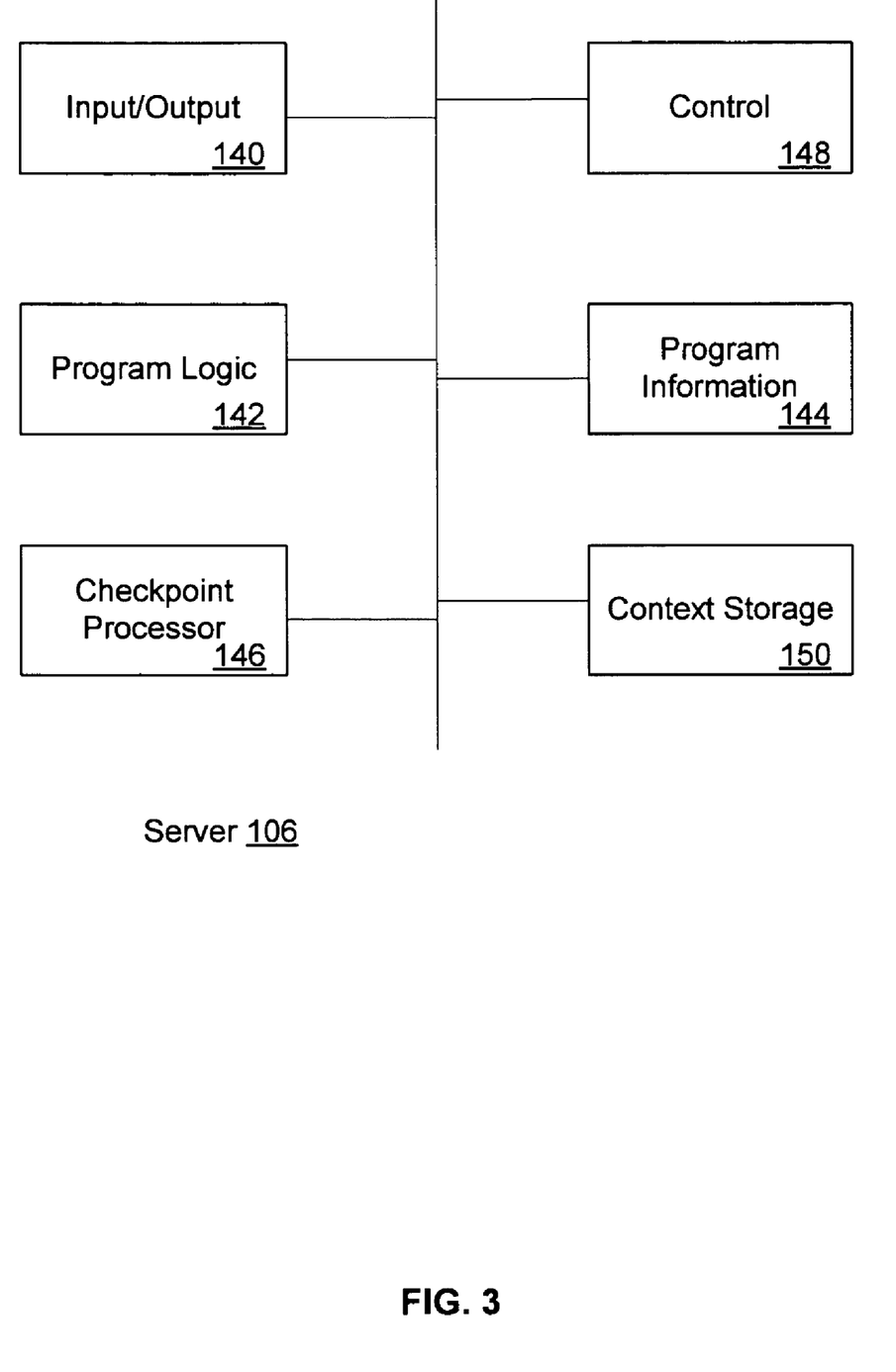
FIG. 3 illustrates a server according to an embodiment of the present invention.

FIG. 3 illustrates a server according to an embodiment of the present invention. The server 106 includes an input/output block 140, a program logic block 142, a program information block 144, a checkpoint processor 146, and a control block 148. These functional blocks are shown in a functional relationship in FIG. 3. The specific arrangement, features, relationships, interactions, etc. between the functional blocks may vary, depending upon the actual implementation of the hardware and/or software of the server 106.

The input/output block 140 interfaces the server to the link 110. The input/output block 140 receives requests from the clients 102 via the session manager 104, sends responses to the clients 102 via the session manager 104, and exchanges session migration information with the session manager 104 and with other servers.

The program logic block 142 executes one or more algorithms in the server. For example, logic block 142 may implement business logic in the server 106 for business software applications. In general, the program logic operates on the program information in response to requests from the clients 102.

The program information block 144 stores the underlying program information. For example, business information relating to business software applications may be the subject of the requests from the clients. In other embodiments, program information may include data in a database or data structures used by applications for storing information for a program.

The checkpoint processor 146 sets checkpoints resulting from the session migration process, as described more fully below with reference to FIG. 5.

The control block 148 performs overall control and coordination of the functional blocks of the server 106. In addition, the control block 148 controls the session migration process, described more fully below with reference to FIG. 5.

The context storage block 150 stores the client context for each client associated with the server 106. The context storage block 150 may also store any pending requests that are to be transferred to the new server during the session migration process, described more fully below with reference to FIG. 5.

Before describing the specifics of migrating client sessions by embodiments of the present invention, the operation of the client, server, and load balancer shall be described.

Figure 4:
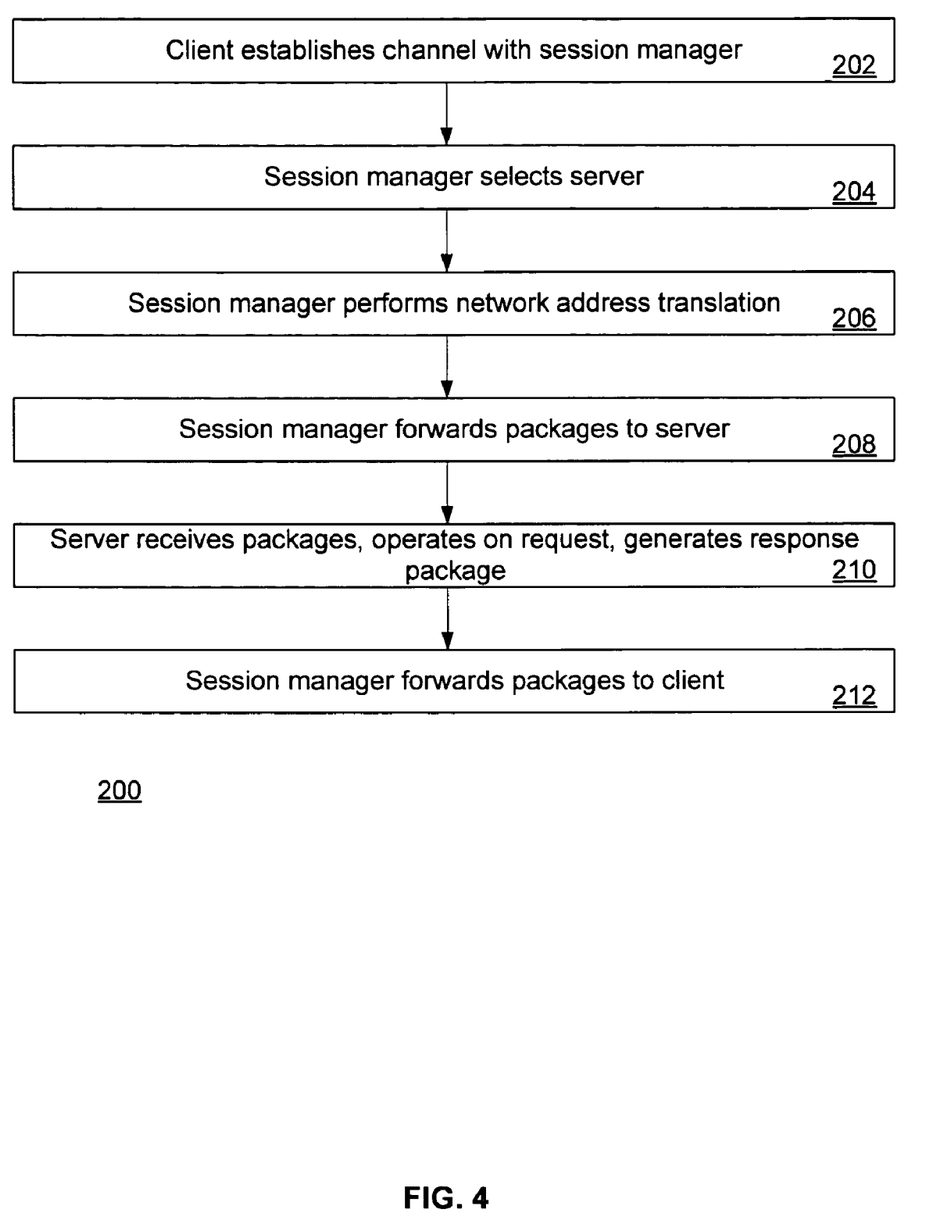
FIG. 4 illustrates a process of communication between a client and a server according to an embodiment of the present invention.

FIG. 4 illustrates a process 200 of communication between the clients 102 and the servers 106 in the client-server system 100.

In step 202, a client 102a establishes a communication channel with the session manager 104. When the client 102a wants to establish a session with one of the servers 106, the client 102a establishes a communication channel with the session manager 104 and sends its requests through the channel. The communication channel may also be referred to as a connection, and may be implemented via a transmission control protocol (TCP) connection. The network packages sent over the communication channel have the IP address of the client 102a as a source address and the IP address of the session manager 104 as a destination address, denoted as (client_ip, load_balancer_ip).

In step 204, when the channel is initialized, the session manager 104 chooses a server 106a based on its own session management algorithm, such as a load balancing algorithm, for example. The server selection block 124 (see FIG. 2) may perform this function.

In step 206, the session manager 104 performs network address translation. When network packages from the client 102a are received from the channel, the session manager 104 translates the destination address from its own IP address to the IP address of the chosen server 106a. The network address translation block 122 (see FIG. 2) may perform this function.

In step 208, the session manager 104 forwards the packages to the chosen server 106a with the information (client_ip, chosen_server_ip).

In step 210, the server 106a receives the packages from the session manager 104, operates on the request from the client 102a contained in the packages, and generates response packages to send back to the session manager 104. The current server 106a establishes a context for the client 102a and serves the requests from the client 102a based on the context. The context for the client may be modified during the session by the current server 106a. The context may be stored in the context storage block 150 (see FIG. 3), for example. When the server 106a responds to the client 102a, the response may include the information (e.g., including chosen_server_ip, client_ip) in its packages.

In step 212, the session manager 104 forwards the response packages back to the client 102a. As the session manager 104 acts as a gateway, it receives network packages from the server 106a and translates the source address of the packages from the server's IP address to its own IP address.

Thus, the communication between the client 102a and the server 106a is established with the help of the session manager 104. The client 102a stays with the current server 106a until it finishes with its session. When there is a need to move the client to another server due to load balancing or other reasons, the following steps may be followed.

Figure 5:
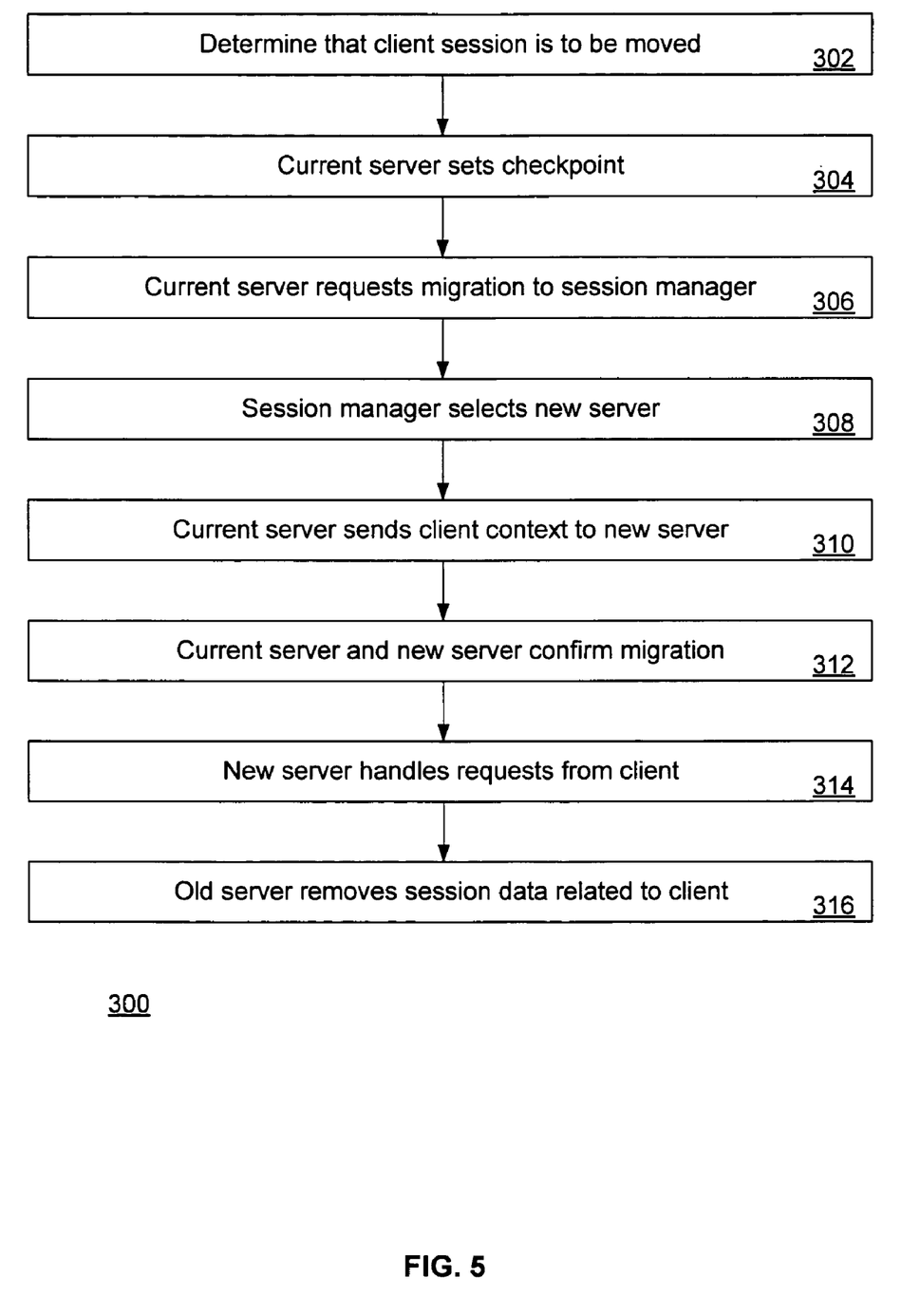
FIG. 5 illustrates a session migration process according to an embodiment of the present invention.

FIG. 5 illustrates a process 300 of migrating a client session from one server to another. Assume that the client 102a has already established a session with the server 106a, referred to as the current server 106a, according to the process 200 described above with reference to FIG. 4.

In step 302, it is determined that the client session should be moved from the server 106a to another server. There are a number of ways to make this determination. According to one embodiment, the server 106a via its control block 148 determines that the client session should be moved. Examples include when the control block 148 determines that the load of the server 106a is high, that a failure of the server 106a has occurred, or that maintenance of the server 106a is planned, etc. According to another embodiment, the session manager 104 determines that the client session should be moved. Examples include when the server selection block 124 detects that a new server has been added to the group of servers 106, that the requests recently directed to one server are much more load intensive than the requests directed to another server, or that the load on a server is above a defined threshold.

As another example, the proposed method can be used to consolidate the workload on several servers. In some systems, all servers may have some client sessions running, but the load of the system as a whole may be low. Thus, it may be desirable to shut down one or more of the servers to improve efficiency of the network. However, if a server is simply turned off, there may be some interference with one or more user's activities. Accordingly, with the proposed method, the system can migrate client sessions on one server and turn off or free other servers for other uses.

In step 304, the current server 106a may set a checkpoint for the migration to start. A checkpoint is a point at which the client context will not be changed until the next coming request. The exact point is dependent on application and server implementations. Some possible candidates for the checkpoint are the finishing of a transaction for the client 102a or the finishing of a dialog step for the client 102a. An example of a checkpoint in a J2EE system may be a time point when a request which is served by a session bean is finished. Until the checkpoint is reached, the server 106a may continue processing related to the request from the client 102a, for example. The checkpoint processor 146 (see FIG. 3) may implement this step.

In step 306, after the checkpoint has been reached, the current server 106a may register a notification or request for migration of the client 102a to the session manager 104. The request for migration includes a request for a possible new server.

In step 308, the session manager 104 selects a new server 106b based on certain policies. For example, polices may include choosing a server according to a round-robin scheme, choosing a server according to current work load of all servers, choosing a server randomly, or choosing a server according to load prediction of all servers. The server selection block 124 (see FIG. 2) may perform this function. The session manager 104 sends the current server 106a the information of the new server 106b. The session manager 104 also sends a request to the selected new server 106b to prepare for handling client migration and to establish a network connection (which may be a TCP connection) on behalf of the client 102a with the selected server 106b. The session manager 104 withholds all incoming requests from the client 102a. The request queue 126 (see FIG. 2) may store these incoming requests.

In step 310, the current server 106a having received the information of the new server 106b extracts the client context and sends the context together with any pending requests in its requesting queue from the client 102a to the new server 106b. The context may be sent via network or global file systems over the link 110, for example. In another embodiment, the current server 106a may transfer information to the new server 106b by sending the information through the session manager or another system, rather than sending it directly.

In step 312, the current server 106a and the new server 106b send a confirmation of the finish of the migration of client context to the session manager 104.

In step 314, the new server 106b starts handling the requests from the client 102a after it receives the client's context. After the request of moving a client was registered, the session manager 104 may withhold requests from the client 102 (see step 308) until it had received the confirmation from a new server (see step 312). After receiving the confirmation, the session manager 104 may redirect all pending requests and future requests from the client 102a to the new server 106b for handling.

In step 316, the server 106a (previously the current server 106a, now the previous server 106a) removes the session data related to the client 102a. From now on, the new server 106b will handle all requests from the client 102a.

Different embodiments and implementations of the present invention may include a number of different advantages over existing systems. One advantage of some embodiments of the present invention is that they may have a small footprint (i.e., computationally less intensive). The size of user context and server processes will depend on the application. Typically, in a SAP R/3 system, for example, the average size of user context may be less than 512K bytes. On the other hand, the size of a process of a server application could be more than 100M Bytes. For example, the average size of a SAP R/3 server process may be as much as 200M bytes. Furthermore, server processes contain client contexts. When there are more users, the size of server process will become larger. When comparing embodiments of the present invention against approaches which migrate at the process level, such as the "'411 application" described above, the proposed approach has a small footprint because in order to migrate 10 sessions, for example, 5M (5120K) bytes data may be required to transfer from one server to another with the inventive techniques described herein. As much as 200M of data, for example, may be required to transfer with the technique described in "'411 application."

Another advantage of some embodiments of the present invention is that they may be transparent to end users. The whole migration may be handled by the session manager and related servers. In this case, the connection between the client and the session manager may be kept alive all the time. The client may not need to do any action during the whole procedure. Although there may be some kind of delay, all requests from the client during the migration can typically be served.

Another advantage of some embodiments of the present invention is that they may work at the application layer and involve modification of the network flow of the network layer (layer 3).

Another advantage of some embodiments of the present invention is that the clients and servers may not need to be located in the same Layer 2 switch network.

Another advantage of some embodiments of the present invention is that no address information may need to be added to clients or servers, and no address information of clients needs to be migrated between servers.

Yet another advantage of some embodiments of the present invention is that they may not require servers to continuously broadcast session information.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims. The terms and expressions that have been employed here are used to describe the various embodiments and examples. These terms and expressions are not to be construed as excluding equivalents of the features shown and described, or portions thereof, it being recognized that various modifications are possible within the scope of the appended claims.

What is claimed is:

1. A session migration method comprising:
managing, by a session manager, a session between a client and a first server using network address translation;
managing, by a first server, a context for said client, wherein said context is related to said session, and wherein said context corresponds to credentials and states of said session;
managing, by said first server, a plurality of session beans that contains said context;
determining that said session is to be moved from said first server according to a network efficiency to consolidate a workload of a plurality of servers that includes said first server and a second server;
identifying, by said session manager according to a policy applied to the plurality of servers, said second server other than said first server to manage said context;
defining, by said first server, a checkpoint for holding said context in a current state;
notifying, by said first server to said session manager, that said context is ready for transfer from said first server, wherein said step of notifying is performed after said checkpoint has been reached;
sending, from said session manager to said first server, address information of said second server;
sending said context from said first server to said second server, wherein said first server uses said address information when sending said context from said first server to said second server;
freeing said first server for an other use after said context has been sent;
managing, by said session manager, said session between said client and said second server using network address translation; and
managing, by said second server, said context.

2. The method of claim 1, further comprising:
sending, from said first server to said second server, a pending request from said client, after said step of notifying.

3. The method of claim 1, further comprising:
instructing, by said session manager after said step of notifying, said second server to expect said context from said first server.

4. The method of claim 1, wherein said step of determining is performed by said session manager in a client-server system.

5. The method of claim 1, wherein said step of determining is performed by said first server.

6. The method of claim 1, further comprising:
managing, by said first server, a plurality of credentials and states as part of said context.

7. The method of claim 1, wherein said session corresponds to a transmission control protocol (TCP) session in which a plurality of messages are exchanged between said client and said first server, and wherein said context is updated continuously in response to said plurality of messages being exchanged.

8. The method of claim 1, wherein said context corresponds to session beans.

9. The method of claim 1, wherein said context is smaller in size than said session.

10. The method of claim 1, wherein said policy is a round-robin policy applied to said plurality of servers.

11. The method of claim 1, wherein said policy is a current workload policy applied to said plurality of servers.

12. The method of claim 1, wherein said policy is a random choice policy applied to said plurality of servers.

13. The method of claim 1, wherein said policy is a load prediction policy applied to said plurality of servers.

14. A server for migrating a client session in a client-server network comprising:
   a program logic component that executes one or more algorithms;
   a program information component that stores program information;
   a context storage component that stores a context related to a session with a client, wherein said context corresponds to credentials and states of said session, wherein said server manages a plurality of session beans that contains said context, and wherein said program logic component uses said context when executing algorithms on said program information;
   a control component that controls a migration process by executing processing that includes:
      determining that said session is to be moved from said server according to a network efficiency to consolidate a workload of a plurality of servers that includes said server and an other server;
      receiving, from a session manager, information of said other server to which said session with said client is to be migrated according to a policy applied to the plurality of servers, wherein said information includes address information of said other server;
      sending, to said other server, said context using said address information; and
      acknowledging, to said session manager, that said context has been sent; and a checkpoint processor component that identifies a checkpoint for holding said context in a current state,
   wherein the control component executes further processing including notifying, by said server to said session manager, that said context is ready for transfer from said server, after said checkpoint has been reached, and
   wherein the control component executes further processing including freeing said server for an other use after said context has been sent.

15. The server of claim 14, wherein said context storage component stores any pending requests after said checkpoint has been reached, and wherein said control component sends said any requests to said other server with said context.

16. The server of claim 14, wherein said control component sends to said session manager a request that said session be moved.

* * * * *